Patented Mar. 23, 1948

2,438,259

UNITED STATES PATENT OFFICE 2,438,259 d-LYSERGIC ACID DIETHYL AMIDE

Arthur Stoll and Albert Hofmann, Basel, Switzerland, assignors to Sandoz Ltd., Fribourg, Switzerland, a Swiss firm No Drawing. Application April 28, 1944, Serial No. 533,264. In Switzerland April 30, 1943

1 Claim. (Cl. 260—236)

The present invention relates to new d-lysergic acid dialkyl amides which are valuable therapeutical products and to a process for their preparation.

It has been found that by condensing azides of d- or d,l-lysergic acid respectively or of d- or d,l-isolysergic acid respectively or mixtures of these compounds, with dialkyl amines, d-lysergic acid dialkyl-amides are obtained, which products have not yet become known hitherto. The alkyl groups present in the dialkyl amines used according to the present invention can either be identical or different and may be of saturated or unsaturated character. Such amines are for instance dimethyl amine, diethyl amine, dipropyl amine, dibutyl amine, diamyl amine, methyl ethyl amine, ethyl allyl amine, butyl amyl amine, etc.

The new d-lysergic acid amides are distinguished from the known natural and synthetic ergot alkaloids and from the lysergic acid amides described in our U. S. Patent No. 2,090,430 by their powerful specific action on the central nervous system.

The condensation of the d-lysergic acid- or d-isolysergic acid azides with the dialkyl amines is carried out in the presence of an inert organic solvent and preferably at room temperature. During the reaction taking place between the azides and the dialkyl amine generally mixtures of different dialkyl amides will be obtained. This can, for instance, be seen in the following illustrative example showing the reaction of d-lysergic acid azide with diethyl amine. During the interaction of these compounds a mixture will be obtained consisting of d-lysergic acid diethyl amide and of d-isolysergic acid diethyl amide, from which mixture the d-lysergic acid derivative will be separated. By using as starting product d-isolysergic acid azide and diethyl amine, a mixture of d-lysergic acid diethyl amide and of d-isolysergic acid diethyl amide will be obtained, this mixture being subsequently separated into its constituents. Finally by starting from racemic lysergic acid azide or from racemic isolysergic acid azide, mixtures consisting of d,l-lysergic acid diethyl amide and d,l-isolysergic acid diethyl amide will be obtained, from which the d-lysergic acid diethyl amide can be separated in a suitable manner, e. g., in form of its tartaric acid salt.

The following examples, without being limitative, illustrate the present invention, the parts being by weight.

Example 1

3 parts of d-isolysergic acid hydrazide are transformed in the usual way in a hydrochloric acid solution by a treatment with sodium nitrite at 0° C. into the azide, and, after neutralisation of the acid solution with sodium bicarbonate, the azide thus formed is shaken out by means of 300 parts of ethyl ether. The ethereal solution is then dried with freshly calcinated potassium carbonate and treated with 3 parts of diethyl amine. The solution is allowed to stand, preferably in the dark and at room temperature, for 24 hours with repeated shaking. The ether is then evaporated in vacuo, the residue triturated with 30 parts of water and filtered by suction. The dark amorphous product thus obtained possesses the specific rotation of $[\alpha]_D^{20}$=about+100° (in pyridine) and consists essentially of a mixture of nearly equal parts of d-lysergic acid diethyl amide and d-isolysergic acid diethyl amide.

The separation of both isomers can be carried out for instance by the so-called chromatographical adsorption method. For this purpose the mixture is dissolved in chloroform containing about 0.5% of ethanol and is passed through a column of aluminium oxide of 60 cm. length and 4 cm. radius and the chromatogram developed with the same solvent. The dark impurities pass rapidly into the filtrate. Then follows a bright zone, which has a blue appearance in ultraviolet light and which contains the d-lysergic acid diethyl amide. From this fraction 1.0 to 1.3 parts of this product will be obtained A further slowly passing portion of the solution contains the d-isolysergic acid diethyl amide. By evaporating this chloroform fraction and crystallising the residue from acetone, 0.8 to 1.2 parts of a compound crystallising in beautiful prisms of melting point 182° C. (corr.) under decomposition is obtained, this compound being the pure d-isolysergic acid diethyl amide. Its specific rotation is $[\alpha]_D^{20}$=+217° (c=0.4 in pyridine). Elementary analysis has given the following values: C 74.41; H 7.48; N 13.27%. The calculated values for d-isolysergic acid diethyl amide, i. e., $C_{20}H_{25}ON_3$, are C 74.25; H 7.79; N 13.00%.

The d-isolysergic acid diethyl amide can be transformed into the d-lysergic acid diethyl amide by using the methods known for the ergot alkaloids. By allowing the solution of the iso-compound to stand in dilute alcoholic potassium hydroxide, a mixture of about equal parts of lysergic acid and isolysergic acid compounds will be produced after a short time. The d-lysergic acid diethyl amide can then be separated from the mixture in the manner described above.

The amorphous d-lysergic acid diethyl amide, which can be separated by the chromatographical method, crystallizes, by dissolving it in a small quantity of acetone and diluting this solution with ethyl ether, in bundles of needles. From benzene pointed prisms will be obtained, that melt under decomposition at 80°–85° C. (corr.). The new compound is difficultly soluble in water, but very easily soluble in methanol and ethanol. It possesses the specific rotation of $[\alpha]_D^{20} = +30°$ ($c = 0.4$ in pyridine). Elementary analysis gives the following values: C 73.50; H 7.81; N 12.92%. For d-lysergic acid diethyl amide, $C_{20}H_{25}ON_3$, the calculated values are: C 74.25; H 7.79; N 13.00%.

By dissolving one equivalent of the base with one equivalent of d-tartaric acid in a small quantity of methanol the neutral tartrate of d-lysergic acid diethyl amide crystallizes out in form of bundles of needles. The salt is very easily soluble in water and melts undistinctly and under decomposition at 200° C. (corr.).

Example 2

An ethereal solution of d-lysergic acid azide, prepared in the usual manner from 3 parts of d-lysergic acid hydrazide, is treated with 3 parts of diethyl amine and allowed to stand for 24 hours in the dark and at room temperature with occasional shaking. The isolation of the compound thus produced is carried out in the manner described in the Example 1. The first separation by means of the chromatographical adsorption yields 1.3 to 1.7 parts of d-lysergic acid diethyl amide and about 0.5 to 0.8 part of d-isolysergic acid diethyl amide.

Example 3

3 parts of racemic isolysergic acid hydrazide are transformed in the usual manner into the respective azide and the formed compound is precipitated by means of an excess of a sodium bicarbonate solution in the form of voluminous yellowish flocks, which are separated by suction and immediately introduced at −5° C. into a solution of 3 parts of diethyl amine in 30 parts of ethanol. The azide readily dissolves in the solution which becomes brown and is then heated slowly to 30° C. The solution is maintained at this temperature for 1 hour, whereupon the solvent is evaporated in vacuo. The sticky residue is triburated with 30 parts of water and filtered. The raw condensation product amounting to about 2.8 parts consists of racemic isolysergic acid diethyl amide and of racemic lysergic acid diethyl amide and is separated by the chromatographical method in the manner described in Example 1. During the chromatographical separation two zones are obtained which are colored, in ultra-violet light, in brilliant-blue shades. The more rapidly passing zone contains the racemic lysergic acid diethyl amide, whereas the slower passing zone consists of racemic isolysergic acid diethyl amide.

From the racemic lysergic acid diethyl amide the d-lysergic acid diethyl amide can be separated by transforming the same for instance into its neutral tartaric acid salt. For this purpose 3.2 parts of racemic lysergic acid diethyl amide ($1/100$ mol.) are dissolved in 6 parts of methanol and added to a solution of 0.75 part of d-tartaric acid ($1/200$ mol.) in 2 parts of methanol.

On inoculation with d-lysergic acid diethyl amide tartrate this compound crystallizes out in nearly colorless bundles of needles. Yield 1.0 to 1.2 parts. The properties of the compound thus obtained are identical with those described in Example 1 for the neutral d-tartaric acid salt of d-lysergic acid diethyl amide.

What we claim is:

The crystalline d-lysergic acid diethyl amide, which crystallizes from benzene in prisms melting with decomposition at 80–85° C., which is difficultly soluble in water but easily soluble in methanol and in ethanol, which possesses the specific rotation $[\alpha]_D^{20} = 30°$ ($c = 0.4$ in pyridine) and which corresponds to the formula $C_{20}H_{25}ON_3$.

ARTHUR STOLL.
ALBERT HOFMANN.

REFERENCES CITED

The following references are of record in the file of this patent:

UNITED STATES PATENTS

| Number | Name | Date |
|---|---|---|
| 2,090,430 | Stoll et al. | Aug. 17, 1930 |
| 2,265,207 | Stoll et al. | Dec. 9, 1941 |
| 2,265,217 | Stoll et al. | Dec. 9, 1941 |

Certificate of Correction

Patent No. 2,438,259            March 23, 1948

ARTHUR STOLL ET AL.

It is hereby certified that error appears in the printed specification of the above numbered patent requiring correction as follows:

Column 4, line 46, list of references cited, for "Aug. 17, 1930" read *Aug. 17, 1937*; and that the said Letters Patent should be read with this correction therein that the same may conform to the record of the case in the Patent Office.

Signed and sealed this 24th day of January, A. D. 1950.

[SEAL]

THOMAS F. MURPHY,
*Assistant Commissioner of Patents.*